US008755300B2

(12) United States Patent
Sachse et al.

(10) Patent No.: US 8,755,300 B2
(45) Date of Patent: *Jun. 17, 2014

(54) CIRCUIT, SYSTEM AND METHOD FOR COMMUNICATION BETWEEN TWO NODES OF A RADIO NETWORK

(71) Applicants: Eric J. Sachse, Leipzig (DE); Tilo Ferchland, Dresden (DE); Wolfram Kluge, Dresden (DE)

(72) Inventors: Eric J. Sachse, Leipzig (DE); Tilo Ferchland, Dresden (DE); Wolfram Kluge, Dresden (DE)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/663,187

(22) Filed: Oct. 29, 2012

(65) Prior Publication Data
US 2013/0155887 A1 Jun. 20, 2013

Related U.S. Application Data

(63) Continuation of application No. 12/649,074, filed on Dec. 29, 2009, now Pat. No. 8,406,144.

(60) Provisional application No. 61/141,520, filed on Dec. 30, 2008.

(30) Foreign Application Priority Data

Dec. 30, 2008 (DE) .................. 10 2008 063 253

(51) Int. Cl.
H04L 12/26 (2006.01)
(52) U.S. Cl.
USPC ........................................................ 370/252
(58) Field of Classification Search
CPC ...... H04W 24/00; G01S 13/82; G01S 13/825; G01S 13/84; G01S 5/0284; G01S 5/0289
USPC .......... 370/252, 328–339; 342/118, 127, 458, 342/463–465
See application file for complete search history.

(56) References Cited

U.S. PATENT DOCUMENTS 5,220,332 A 6/1993 Beckner et al.
5,745,437 A 4/1998 Wachter et al.
(Continued)

FOREIGN PATENT DOCUMENTS

CN 101064963 10/2007
CN 101191832 6/2008
(Continued)

OTHER PUBLICATIONS

Sahinoglu, Z. et al., "Ranging in the IEEE 802.15.4a Standard", IEEE Annual Wireless and Microwave Technology Conference (WAMICON), pp. 1-5, Dec. 4-5, 2006.
Nam, Y. et al., "Two-Way Ranging Algorithms Using Estimated Frequency Offsets in WPA and WBAN", 3rd International Conference on Convergence and Hybrid Information Technology, vol. I, pp. 842-847, Nov. 11-13, 2008.

(Continued)

Primary Examiner — Frank Duong
(74) Attorney, Agent, or Firm — Baker Botts LLP

(57) ABSTRACT

A first node of a radio network initiates a mode for finding the range to a second node. The first node transmits to the second node, with the address of the second node, a range finding command, which switches the second node into the range finding mode and controls a sequence. The first node transmits in a transmission time window a first signal, which is received by the second node in an associated reception time window, a first phase value of the first signal being measured. The second node transmits in a transmission time window a second signal, which is received by the first node in an associated reception time window, a second phase value of the second signal being measured. The first frequency is changed by a frequency difference and the second frequency is changed by the frequency difference in a subsequent time window of the sequence.

20 Claims, 2 Drawing Sheets

(56) References Cited

U.S. PATENT DOCUMENTS

| | | |
|---|---|---|
| 6,731,908 B2 | 5/2004 | Berliner et al. |
| 7,277,457 B2 | 10/2007 | Gorday et al. |
| 7,450,069 B2 | 11/2008 | Heidari-Bateni et al. |
| 7,843,379 B2 | 11/2010 | Menzer et al. |
| 2010/0167661 A1 | 7/2010 | Kluge et al. |
| 2010/0167662 A1 | 7/2010 | Kluge et al. |

FOREIGN PATENT DOCUMENTS

| | | |
|---|---|---|
| CN | 101320090 | 12/2008 |
| CN | 101320091 | 12/2008 |
| WO | WO 02/01247 | 1/2002 |

OTHER PUBLICATIONS

ECMA International, "High Rate Ultra Wideband PHY and MAC Standard", Standard ECMA-368, 3rd Edition, pp. 86-89, 151-153, 237-239, and 325-328, Dec. 2008.

De Nardis, L. et al., "Overview of the IEEE 802.15.4/4a Standards for Low Data Rate Wireless Personal Data Networks", 4th Workshop on Positioning, Navigation and Communication, Mar. 22, 2007, pp. 285-289, Mar. 2007.

Eggert, D. et al., "Ranging with IEEE 802.15.4 Narrow-Band PHY", IEEE, 21 Pages, Nov. 2009.

Text of the First Office Action (with translation), Chinese Patent Application No. 2009/10263721.0. Action dated Jul. 26, 2012, but not reported until Oct. 12, 2012.

CIRCUIT, SYSTEM AND METHOD FOR COMMUNICATION BETWEEN TWO NODES OF A RADIO NETWORK

RELATED APPLICATIONS

This nonprovisional application is a continuation of U.S. application Ser. No. 12/649,074, filed Dec. 29, 2009, and entitled "Circuit, System, and Method for Communication between Two Nodes of a Radio Network," and claims priority to U.S. Provisional Application No. 61/141,520 filed Dec. 30, 2008, and to German Patent Application No. DE 102008063253.8, filed in Germany on Dec. 30, 2008.

BACKGROUND OF THE INVENTION

1. Field of the Invention

The present invention concerns a circuit, a system, and a method for communication between two nodes of a radio network.

2. Description of the Background Art

In a radio network, it is desirable to find the position of the nodes of the radio network or at least to determine a distance between the nodes. By this means, a faulty node can be found easily, for example. In addition, slow movements of a node, such as of a means of transport in a factory, can be tracked. Position finding can also be used in firefighting when the nodes dropped from an airplane report a location-specific elevated temperature.

Known from U.S. Pat. No. 5,220,332 is a range finding system with an interrogator and a transponder that permits non-simultaneous measurements between two objects. A carrier signal is modulated with a (low-frequency) modulation signal with a variable modulation frequency in order to determine a distance between the interrogator and the transponder from the change in the modulation signal by means of a phase measurement or alternatively a transit time measurement.

From WO 02/01247 A2 is known a method for, measuring distance between two objects using electromagnetic waves. An interrogation signal from a base station and a response signal from a portable code transmitter are transmitted twice at different carrier frequencies. In this system, the carrier frequencies are correlated, which is to say that they are dependent on one another. The carrier frequencies are matched to one another so that a phase shift between the signals can be measured. The distance of the code emitter from the base station is calculated from this phase shift. The interrogation signal and the response signal can be transmitted at different carrier frequencies or at the same carrier frequency.

If a transceiver of a node for a sensor network is designed in conformance with the industry standard IEEE 802.15.4, then the transceiver cannot simultaneously transmit and receive.

From U.S. Pat. No. 6,731,908 B2 is known a method for determining the distance between two objects for the Bluetooth technology. In this method, the frequency is changed by frequency hopping in order to measure a phase offset for multiple different frequencies. An object has a voltage controlled crystal oscillator in a phase locked loop (PLL), wherein the phase locked loop is closed during reception and opened during transmission so that the receive signal and transmit signal have the same frequency. The phase of the local oscillator signal of the voltage controlled crystal oscillator is coherent with the received signal due to the synchronization by means of the PLL.

SUMMARY OF THE INVENTION

It is therefore an object of the invention to improve a method for communication between two nodes of a radio network to the greatest extent possible.

Accordingly, a method for communication between two nodes of a radio network is provided that preferably conforms with the industry standard IEEE 802.15.4.

In the method, range finding is initiated by a first node of the radio network. The range finding can be initiated during setup of the radio network, for example. Alternatively, the range finding is carried out repeatedly in order to determine a movement of a node. The range finding is initiated by a first node here. A phase measurement is carried out to determine the distance. In order to take into account a multipath propagation, the phase measurement is preferably carried out for multiple frequencies.

In a method step, a command (RRC—Ranging Request Command) for range finding with the address of the second node is transmitted from the first node to the second node in the range finding mode. The command for range finding is preferably transmitted from the first node to the second node in the payload data of a frame.

In a method step, the second node is switched from an operating mode, for example a normal mode, into a range finding mode, by the range finding command. Preferably the second node carries out range-finding-specific functions in the range finding mode that are deactivated in the normal mode.

In the range finding mode, a sequence is controlled by the command. The sequence provides multiple time windows in which method steps take place. The sequence in both nodes is controlled by the command.

As a result of the control by the command, a first signal is transmitted by the first node in a transmission time window of the sequence. The first signal is received by the second node in a reception time window of the sequence associated with the transmission time window, and a first phase value of the first signal is measured.

As a result of the control by the command, a second signal is transmitted by the second node in a transmission time window of the sequence. The second signal is received by the first node in a reception time window of the sequence associated with the transmission time window, and a second phase value of the second signal is measured.

As a result of the control by the command, the first frequency of the first signal is changed by a frequency difference and the second frequency of the second signal is changed by the frequency difference in a time window following the transmission and reception time windows. The change in the first frequency and the change in the second frequency take place in the same direction here. In this process, the first frequency and the second frequency are increased by the frequency difference or the first frequency and the second frequency are decreased by the frequency difference.

The invention has the additional object of specifying a circuit of a node of a radio network that is improved to the greatest degree possible.

Accordingly, a circuit of a node of a radio network is provided, which preferably conforms with the industry standard IEEE 802.15.4. Preferably the circuit has a transmitting/ receiving circuit (transceiver) for transmitting and receiving payload data within the radio network. Preferably the circuit is monolithically integrated on a semiconductor chip.

The circuit is designed for address-dependent reception of a range finding command. To this end, the hardware functions and software functions corresponding to the command are implemented in the circuit. The circuit preferably has the function of address decoding so that range finding commands that are not addressed to the circuit are rejected.

The circuit is designed such that the circuit can be switched into a range finding mode by the received command. Program sections and functions for range finding implemented in the circuit that are deactivated in the normal mode are preferably activated in the range finding mode.

The circuit is configured to control a sequence by the command. The sequence provides multiple time windows in which method steps of a program sequence of the circuit take place.

The circuit is configured to transmit a first signal in a transmission time window of the sequence under control by the command. Preferably the first signal is an unmodulated carrier signal. An example of an unmodulated carrier signal is a high-frequency sinusoidal signal.

The circuit is configured to receive a second signal in a transmission time window of the sequence under control by the command. In addition, the circuit is configured to measure a first phase value of the second signal. Preferably the second signal is an unmodulated carrier signal.

The circuit is configured to change a first frequency of the first signal by a frequency difference in a time window of the sequence following the reception time window.

The circuit is configured to change the reception frequency under command control. The change here is by the magnitude of the frequency difference. The reception frequency has the altered frequency for the reception of the second signal in another, subsequent reception time window of the sequence. The change in the first frequency and the change in the second frequency take place in the same direction here. In this process, the first frequency and the second frequency are increased by the frequency difference or the first frequency and the second frequency are decreased by the frequency difference.

Another aspect of the invention is a radio network system, in particular according to the industry standard IEEE 802.15.4. The system has a first node and at least one second node. Preferably at least one of the second nodes has a circuit described above.

The first node of the system is configured for initiating a mode for the measurement of a distance to the second node. The first node is configured for transmitting to the second node a range finding command with the address of the second node. The second node can be switched into a range finding mode by the command.

In the range finding mode, the first node and the second node are configured to control a sequence in both nodes by the command. The sequence provides multiple time windows in which method steps of a program of the circuit take place.

As a result of the control by the command, the first node is configured to transmit a first signal in a transmission time window of the sequence, and the second node is configured to receive the first signal and to measure a first phase value of the first signal in an associated reception time window of the sequence.

As a result of the control by the command, the second node is configured to transmit the second signal in a transmission time window of the sequence, and the first node is configured to receive the second signal and to measure a second phase value of the second signal in an associated reception time window of the sequence.

The first node is configured to change the first frequency of the first signal by a frequency difference in a time window of the sequence. The second node is configured to change the second frequency of the second signal likewise by the frequency difference. The change in the first frequency and the change in the second frequency take place in the same direction here. In this process, the first frequency and the second frequency are increased by the frequency difference or the first frequency and the second frequency are decreased by the frequency difference.

The refinements described below relate equally to the method, the circuit, and the system. Functional features of the circuit or of the system derive from features of the method here. Method features can also be derived from functions of the circuit or of the system.

According to an advantageous embodiment, provision is made for the transmission time window and reception time window to be repeated after the time window for changing the first frequency of the first signal and the second frequency of the second signal. With the repetition, a third phase value of the first signal and a fourth phase value of the second signal are measured. Preferably the distance is calculated from the first phase value, second phase value, third phase value, fourth phase value, and the frequency difference. Preferably exactly one distance value is calculated from the first phase value, second phase value, third phase value, fourth phase value, and the frequency difference.

In order to take into account a multipath propagation, in particular, provision is preferably made for the transmission time window, reception time window, and time window for changing the first and second frequencies to be repeated for a plurality of different first frequencies and a plurality of different second frequencies.

According to an embodiment, a sequence of the first and/or second frequency for range finding is transmitted to the second node with the range finding command.

In an embodiment, provision is made that a frame for synchronizing a start time for the range finding is transmitted from the second node to the first node. As a result of the synchronization, a first method sequence in the first node and a second method sequence in the second node are coordinated with one another in time. Preferably a time synchronization of the transmission time windows and reception time windows of the sequence in the first node and the node takes place as a result of the control by the command. Preferably the time synchronization achieves the result that a transmission time window and an associated reception time window are simultaneous with a predetermined precision of, for example, 1 µs.

According to an embodiment, a first timer is started by the first node as a function of a reception time of the frame for synchronization. Preferably a second timer is started by the second node as a function of a transmission time of the frame for synchronization. The reception time and/or the transmission time relate to a position within the frame, for example the end of the frame or the beginning of the payload data or an indicator within the frame. Since the length of the frame is known by the first node and the second node, the position for the reception time or the position for the transmission time within the frame can be agreed by the first node and by the second node.

Preferably the sequence is started in both nodes in a synchronized manner by the first node upon expiration of the first timer and by the second node upon expiration of the second timer. Steps of the sequence in the first node correspond in time to steps of the sequence in the second node here. For example, multiple different frequencies are used sequentially for range finding. The switch between two frequencies in the first node and in the second node is coordinated in time as a result of the synchronization within an agreed time window, for example.

In an embodiment, the second node transmits an acknowledgment (ACK) back to the first node after the successful reception of the range finding command. Upon receiving the acknowledgment, the first node is ready for the range finding, and preferably switches its receiver over. With the switchover, the first node is preferably configured to receive a synchronization frame with an altered indicator.

According to an embodiment, an indicator (SFD—Start of Frame Delimiter) contained in a frame is changed by the first node to flag payload data (PSDU) of a frame to be decoded that follows the indicator. Preferably the indicator is changed to a value associated with the range finding controlled by the command (RRC). The value preferably is not standard-conformant here. It is likewise possible to switch the first node to the altered indicator immediately after transmitting the range finding command, so that the second node would not have to send an acknowledgment. In this case, the first node would have a timeout counter to monitor whether the second node is configured for range finding. In the absence of a synchronization frame from the second node, the first node would terminate the range finding mode.

According to an embodiment, the second node transmits a frame, in particular the synchronization frame, with the altered indicator value in the range finding mode. Since the value of the indicator is not standard-conformant, higher layers of uninvolved nodes are not occupied with the analysis thereof. In contrast, the first node preferably analyzes the reception of the frame for synchronization in higher layers in the range finding mode. In advantageous manner, the first node immediately resets the indicator to a standard value after receiving the synchronization frame.

According to an embodiment, provision is made that measurement results of the range finding are transmitted from the second node to the first node. The transmission of the measurement results takes place after the completion of the range finding, preferably by means of payload data of a standard-conformant frame. The indicator is preferably reset to a standard-conformant value for transmission.

Preferably provision is made that the range finding command is transmitted in a secured manner, in particular encrypted.

Parameters can be transmitted along with the range finding command. The altered value of the indicator and/or a sequence of frequencies for the range finding and/or a time duration for one or more sequence steps of the range finding are transmitted to the second node with the range finding command. The transmission advantageously takes place with payload data of a frame transmitted in a standard-conformant manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
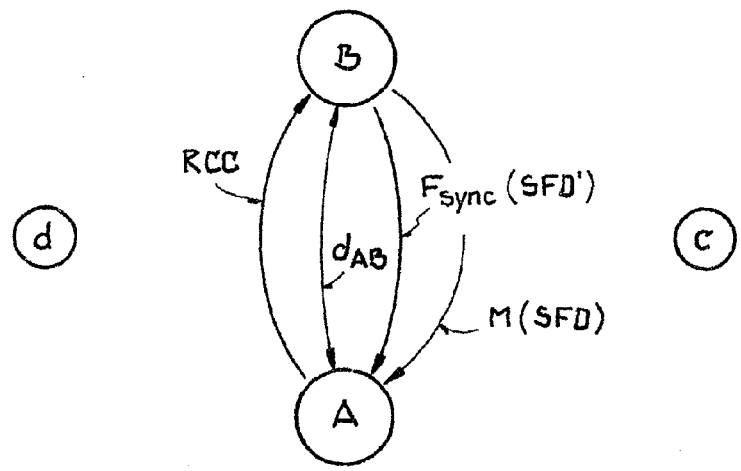
FIG. 1 is a schematic representation of a radio network with nodes A, B, C, and D.

FIG. 1 is a schematic representation of a radio network in accordance with the industry standard IEEE 820.15.4 with nodes A, B, C, and D. The nodes A, B, and C are designed to use a standard-conformant (MAC) command RRC from the range of reserved IEEE 820.15.4 MAC command IDs for range finding. In contrast, the node D has no function for range finding.

In the exemplary embodiment in FIG. 1, node A is the initiator of the range finding of the distance dAB to node B. The target address of node B is known to node A. In the radio network in the exemplary embodiment in FIG. 1, node A is authorized to communicate directly with node B. Node A will trigger the post-processing of the measured data. The post-processing here includes measured data from node A and also measured data M (SFD) from node B.

The node A sends a range finding command RRC to the node B. For the actual range finding, a synchronization of a sequence in the node A and a sequence in the node B is advantageous. To this end, the node B sends a synchronization frame Fsync (SFD') to the node A.

Figure 3:
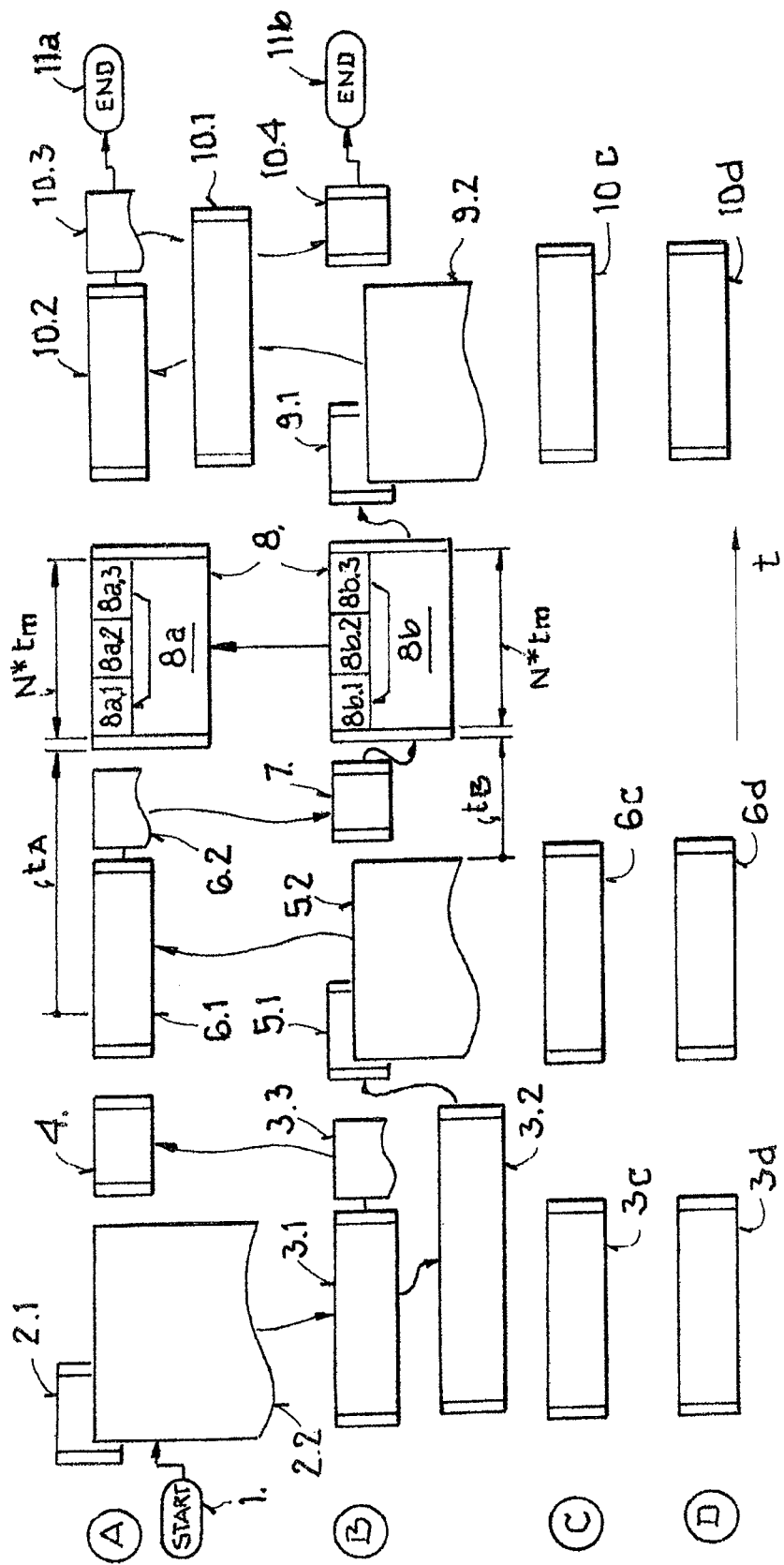
FIG. 3 is a schematic flowchart for range finding in a radio network.

A schematic flowchart for range finding is shown in FIG. 3. In step 1, node A starts range-finding by starting a sequence. Following a standard procedure CSMA-CA in step 2.1 for determining whether a channel can be allocated for transmission, in step 2.2 a command RCC for starting the sequence for range finding is transmitted from node A to node B with the target address. A sequence of frequencies/channels or a target value of an indicator SFD can be included in the transmission to node B as payload data here. The command RRC is encoded as a MAC command frame, with the command ID being configurable. The command ID is from the range of reserved values 3'b100 ... 3'b111.

The command RRC is preferably transmitted in a secured manner. To this end, an encryption can be used, for example. A frequency hop sequence is transmitted with the frame. For example, the sequential frequency values or an index to the hop sequences stored in the nodes A and B can be transmitted for this purpose. As a result of the secured transmission, the sequence of the frequencies—in particular of an unmodulated carrier signal—within the measurements in the frequency range is not known to possible attackers, which makes interfering more difficult.

In step 3.1, the node B detects a match between the target address and its ID, and in step 3.2 extracts the information for the range finding contained in the payload data of the received frame. In step 3.3, the command RRC and the header with frame address are checked by node B and an acknowledgment of reception is returned to node A. Node A receives the acknowledgment and continues the range finding mode with the start of a sequence for range finding. Otherwise node A terminates the range finding mode in the absence of an acknowledgment or initiates it anew to another node. With the reception of the acknowledgment, node A switches its receiver over, to be able to receive a synchronization frame with altered indicator SFD. In addition, after transmitting the acknowledgment, node B transmits a synchronization frame with altered indicator SFD', which accordingly can only be received by node A. In contrast, nodes C and D reject the frame with the altered, non-standard-conformant indicator SFD'.

As a result of this selection, the selection of the participants for the range finding, namely nodes A and B, within the radio network is completed. Node C cannot associate the target address with its ID in step 3*c*. Node D does not recognize the range finding command RRC in step 3*d* and accordingly does not react.

Node B adopts the hop sequence after decrypting the payload data and prepares itself for the measurement sequence. The measurement sequence proceeds synchronously in nodes A and B with an error of +/−1 us, for example.

In step 4, node A changes its indicator SFD to a non-standard-conformant value, which is to say not equal to 0x00 and not equal to 0xA7.

Following a standard procedure for channel allocation (CSMA-CA) in step 5.1, in step 5.2 node B sends an empty frame for synchronization to node A with the altered value of the indicator. The modified value of the indicator prevents other network participants C and D from receiving this frame and being able to interfere. In accordance with FIG. 2, node B starts the measurement sequence in step 8 after expiration of a timer with the timer time tB, wherein the timer is started at the transmit time tFsync and expires at the time tM, the starting time of the measurement sequence.

In step 6.1 of FIG. 3, the synchronization frame is received by node A. The synchronization frame is used by node A at the PHY layer (physical layer)—also called the bit transmission layer in the OSI layer model—as a specific start signal for the measurement sequence in step 8. In accordance with FIG. 2 the node A starts the measurement sequence in step 8 after expiration of a timer with the timer expiration time tA, wherein the timer is started at the reception time tE and expires at the time tM, the starting time of the measurement sequence. In the exemplary embodiment from FIG. 2, the timer is started with the end of the payload data PSDU of the received frame. Two alternatives are likewise shown in FIG. 2, wherein the timer could be started at the time tE' after the indicator or at the time tE" after the preamble SHR. In all cases, the timer would likewise have to expire at the time tM in order to achieve time synchronization with the node B. The accuracy of the synchronization here is dependent, in particular, on the accuracy of the two timers and on the transmission distance.

In addition, in step 6.1 node A resets the indicator to the standard-conformant value 0xA7. Node A sends an acknowledgment in step 6.2, which is received and checked by node B in step 7.

In step 8 the measurement sequence for node A and for node B is carried out within the time period N*tm. The measurement sequence 8 has a transmission time window 8*a*.1 of the node A, which can also be referred to as a transmission phase. Synchronous herewith, the measurement sequence 8 has an associated reception time window 8*b*.1 of the node B, which can also be referred to as a reception phase. The measurement sequence 8 has a transmission time window 8*b*.2 of the node B. Synchronous herewith, the measurement sequence 8 has an associated reception time window 8*a*.2 of the node A. In the time window 8*a*.3 or 8*b*.3, the frequency, for example the carrier frequency of an unmodulated carrier signal, is changed and the step 8 is repeated N times until a measurement of a phase value in the applicable node has been carried out for as many of the frequencies of the sequence as possible.

For the measurement, short bursts are transmitted in alternation and phase relationships and/or amplitude relationships are measured and stored in both node A and node B.

Following a standard procedure for channel allocation in step 9.1, in step 9.2 the measurement results of node B are transmitted back to node A with a standard-conformant frame. The payload data are secured for the transmission. The payload data contents are the amplitude and/or phase values from the measurement in node B.

In steps 10.1 and 10.2 node A receives the measured data from node B, initiates an analysis of the measured data for calculating the distance dAB between the nodes A and B, and in step 10.3 transmits an acknowledgment back to node B, which is received and checked by node B in step 10. 4. In contrast, nodes C and D were unable to detect a match between the target address and their IDs in steps 10*c* and 10*d*. In steps 11*a* and 11*b*, the method for range finding is terminated and the nodes A and B switch to a normal mode.

Figure 2:
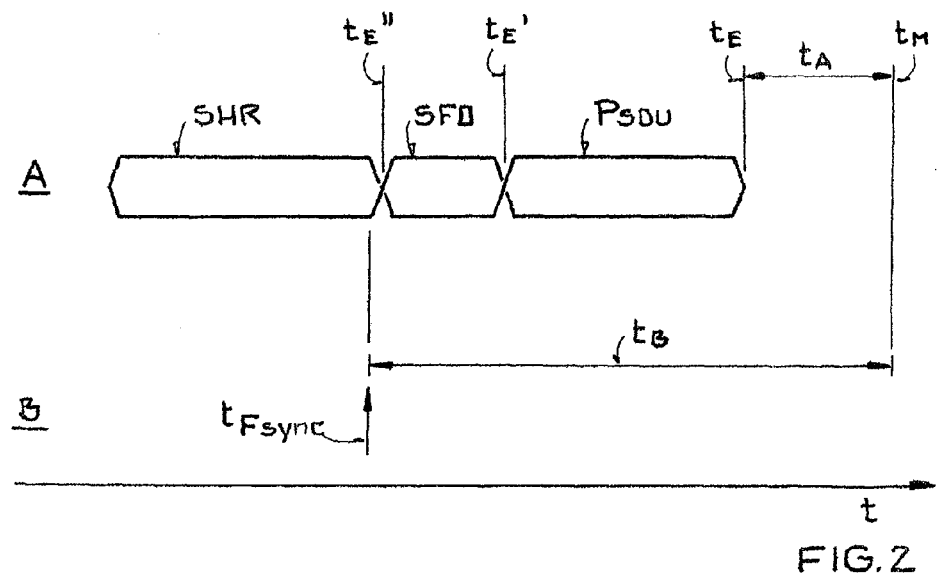
FIG. 2 is a schematic diagram for synchronization.

The invention is not restricted to the variant embodiments shown in FIGS. 1 through 3. For example, it is possible to use different timer start points. It is also possible to specify the precise sequence of frequencies for range finding and/or the changed value of the indicator. In addition, it is also possible to provide the range finding in a radio network complying with a different industry standard, for example WLAN.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for communication between two nodes of a radio network, the method comprising:
    transmitting a first signal by the first node in a first transmission time window of the sequence, the first signal being received by the second node in an associated first reception time window of the sequence;
    measuring a first phase value of the first signal;
    receiving a second signal from the second node in a second transmission time window of the sequence, the second signal being received by the first node in an associated second reception time window of the sequence;
    measuring a second phase value of the second signal;
    changing the first frequency of the first signal by a frequency difference and changing the second frequency of the second signal by the frequency difference in a subsequent time window of the sequence; and
    repeating the first and second transmission time windows and first and second reception time windows to change the first frequency of the first signal and the second frequency of the second signal.

2. The method according to claim 1, wherein a third phase value of the first signal and a fourth phase value of the second signal are measured.

3. The method according to claim 1, wherein the first and second transmission time windows and first and second reception time windows and the time window for changing the first frequency of the first signal and the second frequency of the second signal are repeated for a plurality of different first frequencies and a plurality of different second frequencies.

4. The method according to claim 1, wherein a sequence of the first and/or second frequency for range finding is transmitted to the second node with a range finding command.

5. The method according to claim 1, wherein a frame for synchronizing a start time of the sequence with the first and second transmission time windows and first and second reception time windows and the time window for changing the first frequency and the second frequency is transmitted from the second node to the first node under control of a command.

6. The method according to claim 1, wherein an indicator to flag following payload data of a frame to be decoded contained in a frame is changed by the first node to a value associated with range finding under the control of a command, and wherein the second node transmits a frame or a synchronization frame with an altered value of the indicator in the range finding mode to the first node.

7. The method according to claim 1, wherein a time synchronization of the first and second transmission time windows and the first and second reception time windows of the sequence in the first node and the node takes place as a result of the control by a command.

8. The method according to claim 1, wherein a first timer is started by the first node as a function of a reception time of a frame for synchronization, wherein a second timer is started by the second node as a function of a transmission time of the frame for synchronization, and wherein the sequence is started in both nodes in a synchronized manner by the first node upon expiration of the first timer and by the second node upon expiration of the second timer.

9. The method according to claim 1, wherein measurement results of range finding are transmitted from the second node to the first node with a reset value of the indicator.

10. The method according to claim 9, wherein the altered value of the indicator is transmitted to the second node with a range finding command.

11. The method according to claim 1, wherein a range finding command is transmitted in a secured manner, in particular encrypted.

12. A radio network system, comprising:
a first node comprising a first transceiver; and
a second node comprising a second transceiver,
wherein the first node is configured to transmit a first signal in a first transmission time window of the sequence and the second node is configured to receive the first signal and to measure a first phase value of the first signal in an associated first reception time window of the sequence,
wherein the second node is configured to transmit the second signal in a second transmission time window of the sequence, and the first node is configured to receive, under control by the command, the second signal and to measure a second phase value of the second signal in an associated second reception time window of the sequence, and
wherein the first node is configured to change the first frequency of the first signal by a frequency difference in a subsequent time window of the sequence and repeat the first transmission, and the second node is configured to change the second frequency of the second signal by the frequency difference in the subsequent time window of the sequence and repeat the second transmission.

13. The radio network system according to claim 12, wherein the first node is configured to measure a third phase value of the first signal and the second node is configured to measure a fourth phase value of the second signal.

14. The radio network system according to claim 12, wherein a sequence of the first and/or second frequency for range finding is transmitted to the second node with a range finding command.

15. The radio network system according to claim 12, wherein a frame for synchronizing a start time of the sequence with the first and second transmission time windows and first and second reception time windows and the time window for changing the first frequency and the second frequency is transmitted from the second node to the first node under control of a command.

16. The radio network system according to claim 12, wherein an indicator to flag following payload data of a frame to be decoded contained in a frame is changed by the first node to a value associated with range finding under the control of the command, and wherein the second node transmits a frame or a synchronization frame with an altered value of the indicator in the range finding mode to the first node.

17. The radio network system according to claim 12, wherein the first node is configured to start a first tinier as a function of a reception time of a frame for synchronization, wherein the second node is configured to start a second timer as a function of a transmission time of the frame for synchronization, and wherein the sequence is started in both nodes in a synchronized manner by the first node upon expiration of the first timer and by the second node upon expiration of the second timer.

18. The radio network system according to claim 12, wherein the second node is configured to transmit measurement results of the range finding to the first node with a reset value of the indicator.

19. The radio network system according to claim 18, wherein the first node is configured to transmit the altered value of the indicator to the second node with a range finding command.

20. The radio network system according to claim 19, wherein the range finding command is transmitted in a secured manner, in particular encrypted.

* * * * *